May 5, 1925.

Re. 16,061

F. W. THURSTON

DRILL

Original Filed April 18, 1922 2 Sheets-Sheet 1

INVENTOR
Fred W. Thurston
BY
N. Nagy
ATTORNEY

May 5, 1925.

Re. 16,061

F. W. THURSTON

DRILL

Original Filed April 18, 1922 2 Sheets-Sheet 2

INVENTOR
Fred W. Thurston

BY

N. N. Low
ATTORNEY

Reissued May 5, 1925.

Re. 16,061

UNITED STATES PATENT OFFICE.

FRED W. THURSTON, OF NEW YORK, N. Y.

DRILL.

Original No. 1,477,855, dated December 18, 1923, Serial No. 554,858, filed April 18, 1922. Application for reissue filed March 30, 1925. Serial No. 19,536.

*To all whom it may concern:*

Be it known that I, FRED W. THURSTON, a citizen of the United States, residing at New York, in the county of New York and State of New York, have invented certain new and useful Improvements in Drills, of which the following is a full, clear, and exact description, such as will enable others skilled in the art to which it appertains to make and use the same.

This invention relates to drills which are adapted for drilling rock and the like; and more particularly to drills designed to be percussively driven, and adapted for deep drilling operations.

This invention has for its general object an improved construction and arrangement of parts which is particularly durable and efficient, and is readily adapted to manufacturing and drilling operations.

A more specific object is to provide an improved drill having parts individually adapted to withstanding the stresses and resisting the strains incident to their rôle in the drilling operation.

Another object is to provide a drill comprising separable parts, each designed and selected to have properties intrinsically adapted to its particular duty in the drilling operation.

Another object is to provide a drilling construction which is adapted to admit of the use of a variety of alloy steels, each selected with especial reference to its particular function or location in the construction as a whole.

Another object is to provide a drill construction which has separate sections fitted together each formed of a different alloy steel tempered and treated to impart to it properties specifically adapted to its particular service in the drilling operation.

Another object is to provide a construction for drills composed of separable parts which are rigidly articulated, possess ruggedness and wear-resisting qualities, and are designed to be readily assembled and disassembled; special provision being made against the binding or locking together of the parts.

Still another object is to provide a drill having a detachable bit or head with an intermediate shock-absorbing part which is adapted rigidly to support the detachable bit.

Other objects of this invention will in part be hereinafter specifically pointed out and in part obvious from the arrangements and constructions here set forth.

The invention accordingly consists in the features of construction, combinations of elements and arrangement of parts which will be exemplified in the construction hereinafter set forth, and the scope of their application will appear in the appended claims.

For a more complete understanding of the nature and advantages of this invention reference should be had to the following detailed description, which describes the best illustrative embodiments of this invention at present known to me, taken in connection with the accompanying drawing in which.

Figure 2:
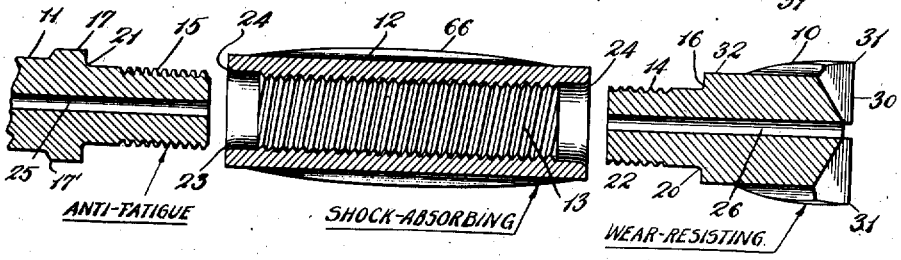
Fig. 2 shows, in longitudinal section, the parts in disassembled relation of the drill shown in Fig. 1.
Figure 2A:
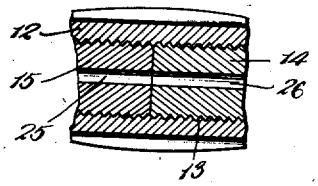

Fig. 2ª shows, in longitudinal section partly broken away, the parts in assembled relation, when the threaded pilots or shanks of the separable parts contact with each other.

Figure 3:
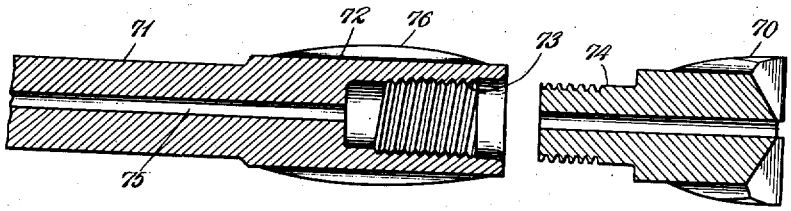
Figure 4:
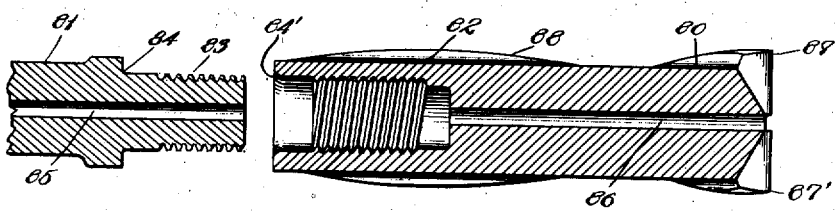
Figure 5:
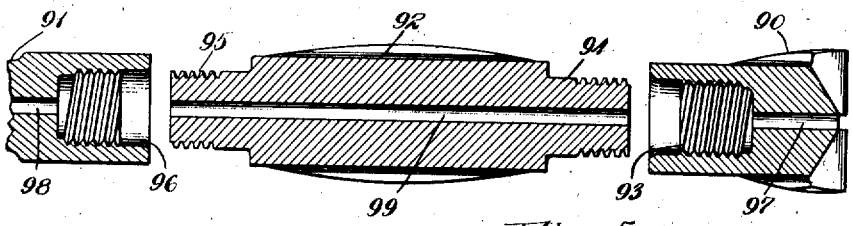
Figure 6:
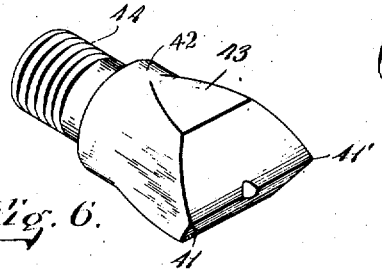
Figure 7:
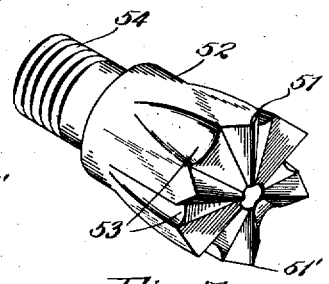
Figure 8:
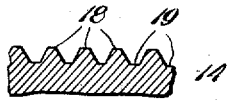

Fig. 3 is a longitudinal section illustrating a modified form of the invention;

Figs. 4 and 5 are longitudinal sections of further modifications;

Figs. 6 and 7 show in perspective other forms of bits adapted for use in the improved drill construction of this invention; and Fig. 8 shows a detail of the thread formations which are practically adapted to prevent locking or binding of the parts together.

Figure 1:
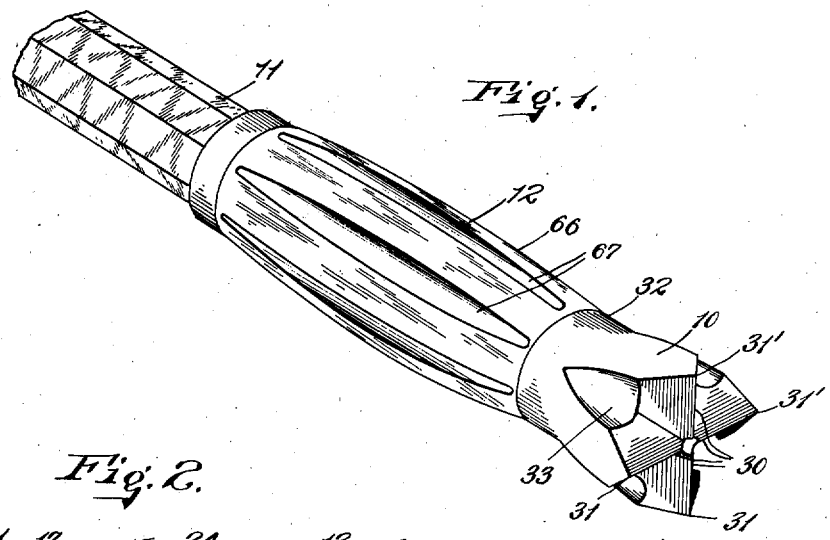
Fig. 1 shows, in perspective, an assembled drill embodying this invention.

Referring now to the drawing, and particularly to Figs. 1 and 2, 10 denotes the bit or drill head which is separable from but rigidly supported by the drill-rod 11. The drill-rod, as illustrated in Figures 1 and 2, is not directly connected with the bit 10, but has an intermediate or coupling part or member 12, which in the instance shown is separable from the drill-rod proper.

In order that the bit 10 may be rigidly supported by the drill-rod, the intermediate or coupling member 12 is designed for threaded engagement with both the bit 10 and the drill-rod 11. This is conveniently accomplished by an interior thread, as shown at 13, which is cut continuously in the same direction through the member 12, and engages with threaded pilots or shanks 14 and 15 respectively provided on the bit 10 and the drill-rod 11. The direction of the thread is such that, when the drill is being rotated during the drilling operation, the drill and intermediate part tend more tightly to screw together. In order that the shanks on which the threads 14 and 15 are made shall be particularly resistant to fracture they are not threaded clear up to the shoulders at 16 on the bit, and at 17 on the drill-rod. The shoulder 17 on the drill-rod 11 is preferably slightly upset, as indicated at 17′, in order that the shoulder may be of the same diameter as that of the intermediate member 12 where these parts abut.

In order that the threaded engagement of the parts shall not readily bind or lock together, the engaging surface of the threads is diminished below that normally obtained for that of the given pitch by giving the threads a truncated formation such form of thread being sometimes referred to as the "Franklin Institute" type, and is shown in enlarged section in Figure 8. Here the apexes of the threads are cut away as indicated at 18, the gutters between the threads being correspondingly filled-in, as indicated at 19. As a consequence, the strength to be had from the thread of given pitch is preserved, but the amount of engaging surface is diminished so that even though the parts should be tightly engaged after a drilling operation, still only a relatively small effort is required to unscrew them. It will be understood however that other forms of threads adapted to discharge this function of being readily unscrewed may be used instead of the truncated form here disclosed.

Shanks 14 and 15 may have little fillets, as shown at 20 and 21 where they meet the shoulders 16 and 17 which strengthen them and prevent them from being readily fractured at this point. The ends of the member 12 are reamed out as shown at 22 and 23 to provide a smooth, cylindrical surface fitting over the unthreaded portions of the shanks 14 and 15, the inturned edges being rounded off, as shown at 24, sufficiently to fit into the curved fillets at 20 and 21. A central passage, as indicated at 25, extends longitudinally through the drill-rod and a similar passage is provided, as indicated at 26 in the bit 10. When the bit and drill-rod are in assembled relation, there is provided a continuous passage through which a fluid medium, such as water or compressed air, may be fed during the drilling operation to cool the bit and assist in the removal of chips and other particles of rock and the like, resulting from the drilling operation.

The bit 10 may have any desired form, a cruciform bit being shown in Figs. 1 and 2. As such the bit has four cutting edges 30 which meet at right angles at the center of the face of the bit. These edges are formed by eight converging plane surfaces on the bit which meet forming dihedral angles. In the bit illustrated, the dimension from tip 31 to tip 31′ along the cutting edges has the greatest transverse magnitude from which the stock of the bit gradually tapers backward until reduced to that of the base at the shoulder 16, as indicated at 32, which has the same diameter as that of the intermediate member 12, thereby providing sufficient clearance for the advance of the bit into the rock as the drilling operation progresses. Four flutes 33 are provided longitudinally of the bit disposed midway between the tips 31 and 31′.

Another form of bit having but one cutting edge is shown in Fig. 6. This bit is frequently referred to as a "Carr" type of bit. In this bit the dimension from tip 41 to tip 41′ is the maximum transverse dimension from which the stock of the bit tapers down to the stock of the shoulder provided with shank 42 in order to provide clearance for the advance of the bit. The sides of the tapering stock of the bit, in a direction at right angles to the direction of the cutting edge, is cut away, to provide clearance surfaces 43 past which the products of the drilling operation may be easily washed by the stream of fluid entering by way of the central passage. This form also has a threaded shank 44 adapted to screw into the threaded portion of an intermediate member.

In Figure 7 is still another modified form of bit which has six cutting edges and is often referred to as a "rose" type of bit. This bit also tapers back from the tip of the cutting edges 51 and 51′ to the main shank 52 to provide proper clearance and also has fluted portions 53 disposed between the cutting tips, and has a threaded shank 54 for securing it into the threaded portion of the intermediate member which is to support it.

By making the drill in parts it is possible to take full advantage of the properties of the various alloy steels known to the arts in devising the drill construction when practicing this invention. Each part is specifically adapted to resist the strains attendant to its particular position in the drill construction, and incident to its rôle in the drilling operation. The bit 10 is particularly designed to have wear-resisting properties, and is preferably made of a chrome-vanadium steel, so shaped and tempered as to provide a cutting edge of suitable hardness which is adapted for repeated resharpenings and regrindings; which operations it is generally desirable to do at the place where the drilling is being done. The bit as a whole is formed so as to avoid brittleness such as might be encountered in the ordinarily tempered tool steel, and the bit may have wear-resisting properties greater than tool steel. The shank 14 at the base of the main body of the bit in particular is made to outlast the cutting edge; in general the different parts of the bit have different properties.

The drill-rod 11 is made of a material which has fatigue resisting properties and hence may be styled as the "anti-fatigue" part of the drill. This drill-rod is preferably made of a vanadium steel which may not be adapted to take a cutting edge but which has long-enduring qualities and anti-fatigue properties greater than those of mild steel and should outlast, in point of time, the service of any other part of the drill. The drill-rod, as shown in Figs. 1 and 2, may be made from ordinary commercial stock designed for tool purposes; such stock in the formation of this portion of the drill being threaded at the end designed to support the bit and in some cases upset and shouldered. This operation can readily be performed by an ordinary blacksmith or other mechanic, and can be done at the mine or place where the drilling operation takes place. As a result the drill-rod, when broken, is adapted readily to be repaired for further service.

The intermediate or coupling member 12 is fitted on the drill-rod 11 and serves as a chuck to support the bit on the drill-rod, and is especially designed to have a shock-absorbing and, in certain constructions of the invention, a more pronounced cushioning function during a drilling operation. It is preferably made of a chrome-nickel steel, such as is standard for the construction of certain types of tools well known in the arts. This steel is treated and tempered so that it will be tough and not readily crystallized or likely to chip as its function is largely to damp out the compressional vibration received from the reactive thrust of the driving force reflected from the bit.

The properties pointed out above, which it is desirable for the several parts to possess in accordance with this invention, are not those incidentally possessed by prior drills, but are made to be the dominant properties which characterize these parts to the substantial exclusion of all others. When these parts are made of alloy steels, these properties are imparted by the heat treatment to which they are subjected, producing thereby the desired temper, though other treatments which produce or tend to produce such properties, it is to be understood, are not thereby excluded. The terms "formed" and "tempered" as used in the claims are accordingly to be interpreted as including such treatments. These properties, however, cannot properly be defined in terms of "degrees of hardness," as this is a varying standard in the practice of this invention; as for example, the bit 10 is required to be "wear-resisting" to the rock material which is to be drilled. When drilling granite, the cutting edge must be harder than when drilling slate rock, yet wear-resisting to both.

The alloy steels here described as suitable for the various drill parts in this invention are not chosen because of their hardness, but because they are susceptible of being tempered to a state where the desired properties are particularly outstanding. These alloy steels possess another property which obviously must be considered when designing drills to embody this invention, namely a sufficiently high elastic limit not to become deformed in the service to which they are put.

The intermediate member when in place may fit snugly against the shoulders 16 and 17 thus receiving and transmitting the compressional vibration from the bit chiefly to the surface of the drill-rod, avoiding thereby transmitting them directly to the threads, and I may also accomplish this object in the only other known manner, as a substitute for said shoulders, by making the inner ends of the bit and drill rod to abut within the intermediate part, in which case shocks and strains are still absorbed by the intermediate part. This intermediate member is generally cylindrical in shape, but is preferably provided with bowed ridges 66 along geometrical elements of its cylindrical surface. These bowed ridges 66 are thus parallel, and are preferably equally spaced about the circumference of the member so as to provide channels 67 therebetween. This construction enables the ridges to perform a three-fold function; one of strengthening the intermediate member, another of reaming out the hole bored as the drill advances, and a third of providing a passage for the chips and other material which is to be washed away by the fluid entering through the central passage of the drill as it advances in the drilling operation. The toughness of this member is preferably of an order such that it will outwear the period of service of many bits, and it may have shock absorbing properties greater than wrought iron.

Fig. 3 illustrates a modified form of drill in which the intermediate member 72 is formed integral with the drill rod 71 and receives a bit 70 in its threaded bore 73. This intermediate member 72 is formed on the upset end of the drill-rod 71 which has the central passage 75 through which flows the medium for washing away the chips, etc., resulting from the drilling operation. This intermediate member as before preferably has the general cylindrical contour shown in Figs. 1 and 2 and is likewise preferably provided with bowed ribs 76 disposed longitudinally about its cylindrical surface in order to strengthen it and enable it to ream the hole being drilled. The threads on the pilot or shank 74 of the bit 70 preferably have the truncated form indicated in Fig. 8, so that the bit can be readily unscrewed from the drill-rod when desired. Likewise the parts for a drill of this construction will be made of alloy steels, or other materials selected to provide properties specifically adapted to resist strains incident to their rôle in the drilling operation.

Fig. 4 shows still another modification in which the intermediate part 82 is made integral with the bit 80, and is adapted for screw threaded engagement on the shank 83 of the drill-rod 81. The drill-rod 81 is provided with a longitudinal passage 85 through which fluid is fed to the bit through its longitudinal passage 86. Also the threads preferably have the truncated formation indicated in Fig. 8 so that the parts may be readily unscrewed, the shank 83 being provdied with a fillet 84 to strengthen it at its juncture with the body of the drill rod proper, the bore of the intermediate part having an unthreaded portion to fit over the unthreaded portion of the shank 83 and a rounded off edge 84′ adapted to fit into the fillet at 84.

The body portion of the bit 80 preferably has a cylindrical contour in order to merge in the general cylindrical form of the intermediate member 82, which thereby provides sufficient stock adapting it to repeated resharpenings and regrindings although the transverse dimension from the tip 87 to tip 87′ becomes thereby reduced as the original stock is ground away from the face of the bit. The intermediate member in this form is also preferably provided with a bowed ridge 88 to strengthen it and enable it to perform a reaming function during the drilling operation. In this modified form of drill, the parts here again will be made of materials selected to have properties specially adapted to resist the strains incident to their particular rôles in the drilling operation.

In Figure 5 still another modification is illustrated. Here the bit 90, instead of being provided with a threaded shank adapted to engage with a threaded bore on the intermediate member, has a threaded bore 93 adapted to engage with a threaded shank 94 on the intermediate member 92. This member has also a threaded shank 95 on its other end, which is similarly adapted to engage with a threaded bore formed in the upset portion of the drill-rod 91. These bores and shanks are formed with truncated threads and fillets as previously indicated in order that the parts may be readily separable after a drilling operation. The bit 90 has a longitudinal passage 97 which communicates with the passage 98 in the drill-rod 91 through a passage 99 formed in the intermediate member 92. Here the separable nature of the parts of the drill affords the utilization of materials selected individually to resist the strains incident to their rôle in the drilling operation.

In operation, a drill of this invention is particularly adapted to be driven by a modern percussion type of rotating head or driving tool and will accommodate the escape of air actuating the tool, by way of the central passages as 25 and 26 formed therein; fluid may also be adapted to remove the chips and other particles produced by the drill as it advances. The compressional vibration transmitted from the bit to the rest of the drill, as a reaction from the driving thrust, is substantially a wavelike disturbance which compounds to some extent with the driving impulse, thereby producing regions where the vibrations are particularly severe, thereby causing strains in the parts, and resulting generally in the development of fractures in drills prior to this invention. The use of an indeterminate member constructed in accordance with this invention, however, sufficiently absorbs the shocks of the compressional vibrations transmitted up through the drill so that the regions of strain are not sufficiently pronounced to develop fractures of a character which shortens life and service of the drill. But the compressional vibrations and shocks are not the only ones to which the intermediate or coupling member is subjected. It is also subject to severe shocks of a tensional nature in the rapid and abrupt reversals of movemen of the drill, and to torsional and shearing shocks due to the rotational movement of the drill in the rock, and to bending and shearing shocks due to the whipping of the intermediate part of the drill out of the right axial line, which may occur in operation, and produces tensional impulses and shocks at one side of the intermediate member towards which the drill is bent sidewise and compressional impulses and shocks at this time in the opposite side of the same member. It will be understood that all of the above mentioned rapidly periodic and wavelike stresses and shocks may be inflicted on said intermediate member at or about the same time and be of a very complex nature, and require a capacity of absorption of them by the material of said intermediate member; and my invention is independent of the separation and of the contact of the threaded ends of the coupled parts in the construction of the drill. In consequence the periods of service of drills employing an intermediate or shock-absorbing member, in accordance with this invention, are relatively longer, thereby enabling drilling operations to be effected with much greater average speed than heretofore. Also the special properties of the drill parts permit the drill to be driven actually at higher rates of speed than previous drills with consequent further economies in the costs of drilling operations. After a drilling operation, the type of thread here used enables the parts of the drill to be readily disassembled for purposes of resharpening or repair.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween. I use the word "intermediate" in describing the part 12, not necessarily in the sense of "interposed," but in the broader sense that it is the intermediary connecting element in the drill construction.

Having described my invention, what I claim as new and desire to secure by Letters Patent is:

1. A drill adapted to be percussively driven into rock and the like, comprising a separable bit and drill rod, including an intermediate member; said bit being formed and tempered to have wear-resisting properties as its dominant characteristic, said drill rod being formed and tempered to have anti-fatigue properties as its dominant characteristic, said intermediate member being formed and tempered to have shock absorbing properties as its dominant characteristic.

2. A drill adapted to be percussively driven into rock and the like, comprising a bit formed to have wear-resisting properties as its dominant characteristic, a drill rod formed to have anti-fatigue properties as its dominant characteristic, and an intermediate member formed to have shock absorbing properties as its dominant characteristic; said bit, rod and intermediate member being separable individually from each other.

3. A drill adapted to be percussively driven into rock and the like, comprising a bit, a drill rod, and a cushioning intermediate member formed and tempered to have shock absorbing properties as its dominant characteristic; said bit and rod formed to be separable from each other.

4. A drill adapted to be percussively driven into rock and the like, including a detachable bit and a cylindrical intermediate member formed of material having shock-absorbing properties as its dominant characteristic; said intermediate member being internally threaded to provide a coupling whereby the detachable bit is secured in place.

5. A drill adapted to be percussively driven into rock and the like, including a detachable bit and a cylindrical intermediate member formed of material having shock-absorbing properties as its dominant characteristic; said intermediate member being formed of chrome-nickel steel and threaded internally to provide a coupling whereby the detachable bit is secured in place.

6. A drill adapted to be percussively driven into rock and the like, including a detachable bit and a cylindrical intermediate member formed of material having shock-absorbing properties as its dominant characteristic; said intermediate member being internally threaded to provide a coupling for the detachable bit, and provided exteriorly with a plurality of ribs.

7. A drill constructed of separable parts adapted to be percussively driven into rock and the like, comprising a drill-rod having anti-fatigue properties greater than mild steel, an intermediate member having shock-absorbing properties greater than wrought iron, and a bit having wear-resisting properties greater than tool steel.

8. A drill constructed of separable parts adapted to be percussively driven into rock and the like, comprising a drill rod of alloy steel having anti-fatigue properties greater than mild steel, an intermediate member of alloy steel different from the first alloy steel, having shock-absorbing properties greater than wrought iron, and a bit of alloy steel different from the other alloy steels having wear-resisting properties greater than tool steel.

9. A drill constructed of separable parts adapted to be percussively driven into rock and the like, comprising a drill rod of vanadium steel having anti-fatigue properties as its dominant characteristic, an intermediate member of chrome nickel steel having shock-absorbing properties as its dominant characteristic, and a bit of chrome-vanadium steel having wear-resisting properties as its dominant characteristic.

10. A drill constructed of separable parts adapted to be percussively driven into rock and the like, comprising a drill rod of vanadium steel tempered to have anti-fatigue properties as its dominant characteristic, an intermediate member having shock-absorbing properties as its dominant characteristic, and a bit having wear-resisting properties as its dominant characteristic.

11. A drill constructed of separable parts adapted to be percussively driven into rock and the like, comprising a drill rod having anti-fatigue properties as its dominant characteristic, an intermediate member having shock-absorbing properties as its dominant characteristic, and a bit of chrome-vanadium steel tempered to have wear-resisting properties as its dominant characteristic.

12. A drill adapted to be percussively driven into rock and the like, comprising separable drilling members having threaded ends and a tubular intermediate portion internally threaded and adapted to engage with said ends, said tubular intermediate portion having shock-absorbing properties as its dominant characteristic.

13. A drill adapted to be percussively driven into rock and the like, comprising a separable bit and drill rod, including a coupling member; said bit being formed and tempered to have wear-resisting properties as its dominant characteristic, said drill rod being formed and tempered to have anti-fatigue properties as its dominant characteristic, said coupling member being formed and tempered to have shock-absorbing properties as its dominant characteristic.

14. A drill adapted to be percussively driven into rock and the like, comprising separable drill members having threaded ends and a tubular coupling portion internally threaded and adapted to engage with said ends, said tubular coupling portion having shock-absorbing properties as its dominant characteristic.

In testimony whereof I affix my signature.

FRED W. THURSTON.